United States Patent
Mayer et al.

(10) Patent No.: US 10,039,168 B2
(45) Date of Patent: Jul. 31, 2018

(54) LED ARRANGEMENT AND METHOD FOR AMBIENT-LIGHT-DEPENDENT BRIGHTNESS CONTROL OF LEDS

(71) Applicant: Ford Global Technologies, LLC, Dearborn, MI (US)

(72) Inventors: Walter Mayer, Bruehl (DE); Rubin Wittenberg, Hennef (DE); Heiner Boehm, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/485,368

(22) Filed: Apr. 12, 2017

(65) Prior Publication Data

US 2017/0318642 A1     Nov. 2, 2017

(30) Foreign Application Priority Data

Apr. 29, 2016    (DE) .......................... 10 2016 207 355

(51) Int. Cl.

| | |
|---|---|
| *H05B 33/08* | (2006.01) |
| *H05B 39/00* | (2006.01) |
| *H04M 1/22* | (2006.01) |
| *G09G 3/14* | (2006.01) |
| *G09G 3/34* | (2006.01) |
| *H05B 37/02* | (2006.01) |

(52) U.S. Cl.
CPC .......... *H05B 33/0854* (2013.01); *G09G 3/14* (2013.01); *G09G 3/3406* (2013.01); *H04M 1/22* (2013.01); *H05B 33/0815* (2013.01); *H05B 37/0218* (2013.01); *H05B 39/00* (2013.01)

(58) Field of Classification Search
CPC ..... G09G 2320/0626; G09G 2360/144; G09G 3/3406; G09G 3/32; H01H 2219/038; H05B 33/0857; H05B 33/0869; H05B 33/0872; H05B 33/0854; H05B 33/0815; H05B 37/0218
See application file for complete search history.

(56) References Cited

U.S. PATENT DOCUMENTS 5,949,225 A * 9/1999 Sawtell ................ H04B 10/802
                                                                                     323/284
6,201,270 B1 * 3/2001 Chen ................ H01L 27/14609
                                                                                 250/214.1

(Continued)

*Primary Examiner* — Vibol Tan
(74) *Attorney, Agent, or Firm* — Vichit Chea; Price Heneveld LLP

(57) ABSTRACT

An LED arrangement comprising at least one LED, which receives an LED illumination voltage in accordance with a square-wave signal, wherein the brightness of the LED is dependent on the ambient luminosity, which is measured by means of the LED, which is switched in a non-illuminated state as a light sensor. The at least one LED is arranged together with a first and a second transistor in a bridge circuit such that the first transistor applies the LED illumination voltage to the LED in accordance with the square-wave signal, and the second transistor applies a voltage having inverted polarity as the LED illumination voltage to the LED in intervals of the turned-off times of the LED, wherein the duty cycle of the square-wave signal is dependent on the strength of a photocurrent, which flows through the LED when the voltage having inverted polarity is applied thereto.

18 Claims, 2 Drawing Sheets

(56) References Cited

U.S. PATENT DOCUMENTS

| | | | |
|---|---|---|---|
| 6,664,744 B2* | 12/2003 | Dietz | G09G 3/3406 |
| | | | 315/291 |
| 7,486,386 B1* | 2/2009 | Holcombe | G01C 3/08 |
| | | | 356/4.01 |
| 7,755,595 B2* | 7/2010 | Ferguson | G09G 3/3406 |
| | | | 345/102 |
| 8,249,731 B2* | 8/2012 | Tran | A61B 5/002 |
| | | | 222/23 |
| 8,456,092 B2* | 6/2013 | Knapp | H04L 12/43 |
| | | | 315/152 |
| 8,674,913 B2* | 3/2014 | Knapp | H04L 12/40013 |
| | | | 345/82 |
| 9,316,695 B2* | 4/2016 | Takahashi | G01R 31/3613 |
| 9,417,734 B2* | 8/2016 | Raynor | G06F 3/0421 |
| 9,733,275 B2* | 8/2017 | Deliwala | G01R 15/09 |
| 9,826,597 B2* | 11/2017 | Tran | H05B 33/0845 |
| 2003/0189211 A1 | 10/2003 | Dietz | |
| 2007/0212681 A1* | 9/2007 | Shapiro | C12Q 1/04 |
| | | | 435/5 |
| 2010/0117543 A1* | 5/2010 | Van Der Veen | H05B 33/0818 |
| | | | 315/150 |
| 2010/0155707 A1* | 6/2010 | Anthopoulos | B82Y 10/00 |
| | | | 257/40 |
| 2011/0260629 A1* | 10/2011 | Uedaira | G01J 1/02 |
| | | | 315/158 |

* cited by examiner

LED ARRANGEMENT AND METHOD FOR AMBIENT-LIGHT-DEPENDENT BRIGHTNESS CONTROL OF LEDS

FIELD OF THE INVENTION

The present invention generally relates to an LED arrangement comprising at least one LED, which receives an LED illumination voltage, i.e., a voltage which causes the LED to illuminate, in accordance with a square-wave signal, wherein the brightness of the LED is dependent on the ambient luminosity, which is measured by means of the LED, which is connected in a non-illuminated state as a light sensor, and a method for the ambient-light-dependent control of the brightness of at least one LED, which is caused to illuminate in accordance with a square-wave signal.

BACKGROUND OF THE INVENTION

U.S. Patent Application Publication No. 2003/0189211 A1 discloses an LED arrangement and an LED operating method having an automatic background illumination for portable electronic devices, for example, cell telephones, which manage without a separate light sensor, in that a microprocessor connected to the LED alternately causes the LED to illuminate and to operate as a light sensor. By rapidly switching over between the two operating modes, the LED appears to illuminate continuously. The brightness of the background illumination can be adapted automatically to the measured ambient luminosity.

Pulse width modulation (PWM) is frequently used to control the brightness of LEDs (light-emitting diodes), wherein the duty cycle of a square-wave signal supplied to the LED, i.e., the ratio of the pulse duration to the period duration, is varied.

PWM-controlled light-emitting diodes are also used in adaptive cockpit illumination in motor vehicles and/or the background lighting thereof. The ambient luminosity is typically measured by means of a separate light sensor, for example, a photodiode, to regulate the cockpit illumination level or background illumination level accordingly.

Such a separate light sensor, its installation, and its wiring are linked to a certain additional expenditure. The light sensor can be influenced by the light of the LEDs, and it can be shaded, for example, by dirt. In addition, the light measurement direction is possibly not optimal.

The circuit disclosed in U.S. Patent Application Publication No. 2003/0189211 A1 does manage without a separate light sensor, but it presumes that a microprocessor is present. However, this microprocessor should not be very remote from the LED, because the photocurrents driven by LEDs are very small. Corresponding conditions are often not readily provided, for example, in the case of cockpit illumination.

It would be desirable to provide an LED arrangement and a control method, which enable ambient-light-dependent brightness control with particularly little expenditure, in that they require neither a separate light sensor nor a microprocessor.

SUMMARY OF THE INVENTION

According to one aspect of the present invention, an LED arrangement is provided. The LED arrangement includes at least one LED which receives an LED illumination voltage in accordance with a square-wave signal, wherein the brightness of the LED is dependent on the ambient luminosity, which is measured by means of the LED, which is switched in a non-illuminated state as a light sensor. The LED arrangement also includes a first and a second transistor arranged together with the at least one LED in a bridge circuit such that the first transistor applies the LED illumination voltage to the LED in accordance with the square-wave signal, and the second transistor applies a voltage having inverted polarity to the LED illumination voltage to the LED in intervals of turned-off times of the LED, wherein a duty cycle of the square-wave signal is dependent on strength of a photocurrent which flows through the LED when the voltage having inverted polarity is applied thereto.

According to another aspect of the present invention, an LED arrangement is provided. The LED arrangement includes an LED, and first and second transistors arranged with the LED in a bridge circuit, wherein the first transistor applies illumination voltage to the LED with a square-wave signal having a duty cycle dependent on a measured photocurrent, and the second transistor applies a voltage having inverted polarity to the illumination voltage to the LED in intervals of turned-off times of the LED to measure the photocurrent.

According to a further aspect of the present invention, a method for controlling brightness of at least one LED. The method includes the steps of providing at least one LED is arranged together with a first transistor and a second transistor in a bridge circuit, applying via the first transistor an LED illumination voltage to the LED in accordance with a square-wave signal to illuminate the LED, and applying via the second transistor a voltage having inverted polarity to the LED illumination voltage to the LED in intervals of the turned-off times of the LED to thereby operate as a light sensor for the ambient light incident on the LED in a non-illuminated state. The method also includes the steps of measuring strength of a photocurrent flowing through the LED, and setting a duty cycle of the square-wave signal as a function of the measured photocurrent strength to thereby control brightness of the at least one LED as a function of ambient luminosity.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
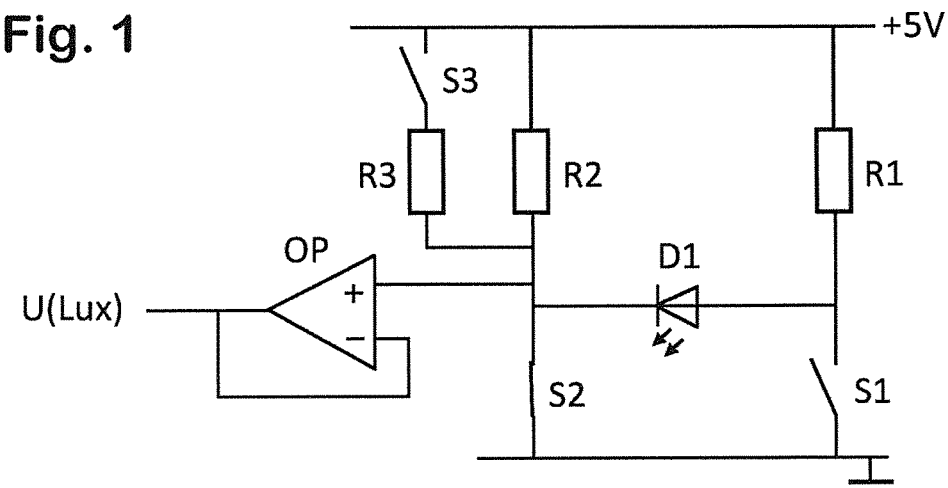
FIG. 1 is a schematic sketch of a circuit for the ambient-light-dependent brightness control of LEDs shown in one state.
Figure 2:
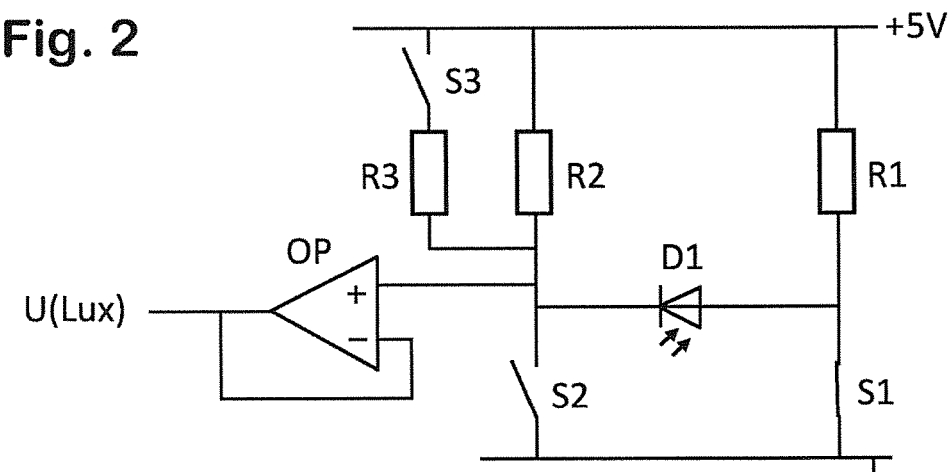
FIG. 2 is a schematic sketch of a circuit for the ambient-light-dependent brightness control of LEDs shown in another state.
Figure 3:
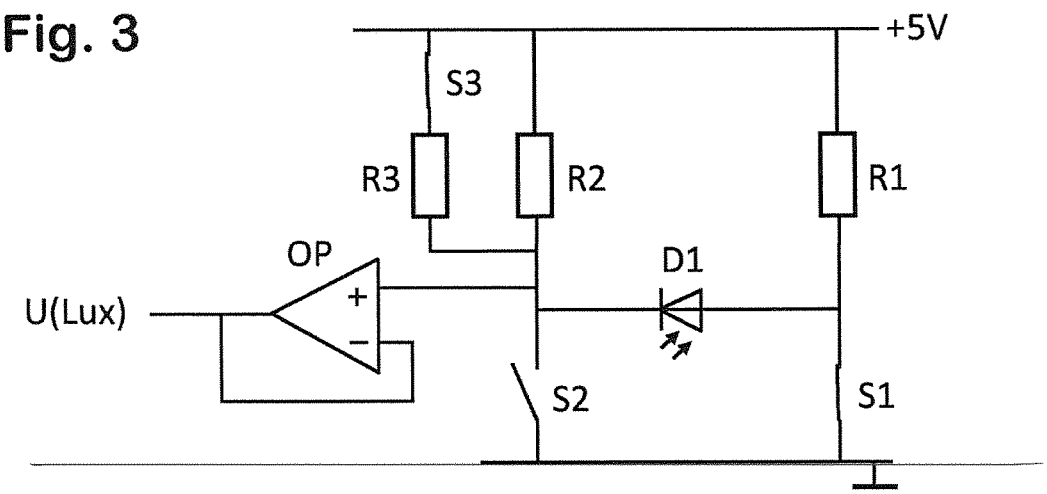
FIG. 3 is a schematic sketch of a circuit for the ambient-light-dependent brightness control of LEDs shown in a further state.

As shown in FIGS. 1-3, an LED arrangement is shown in different states having an LED D1 is arranged together with a first switch S2 and a second switch S1 as well as resistors R1 and R2 in a bridge circuit. In this case, the anode of the LED D1 is connected via the resistor R1 to the positive pole of a 5 V voltage source and via the switch S1 to the negative pole of the voltage source. The cathode of the LED D1 is connected via the resistor R2 to the positive pole of the voltage source and via the switch S2 to the negative pole of the voltage source.

In this exemplary embodiment, still a third switch S3 is provided, which, in the turned-on state, additionally connects the cathode of the LED D1 via a resistor R3 to the positive pole of the voltage source and thus reduces the effective resistance in this branch of the bridge circuit. The resistors R2 and R3 form so-called pull-up resistors, which raise the voltage at the cathode of the LED D1 more or less in the direction of the positive supply voltage when the second switch S1 is turned on and the first switch S2 is turned off.

Figure 4:
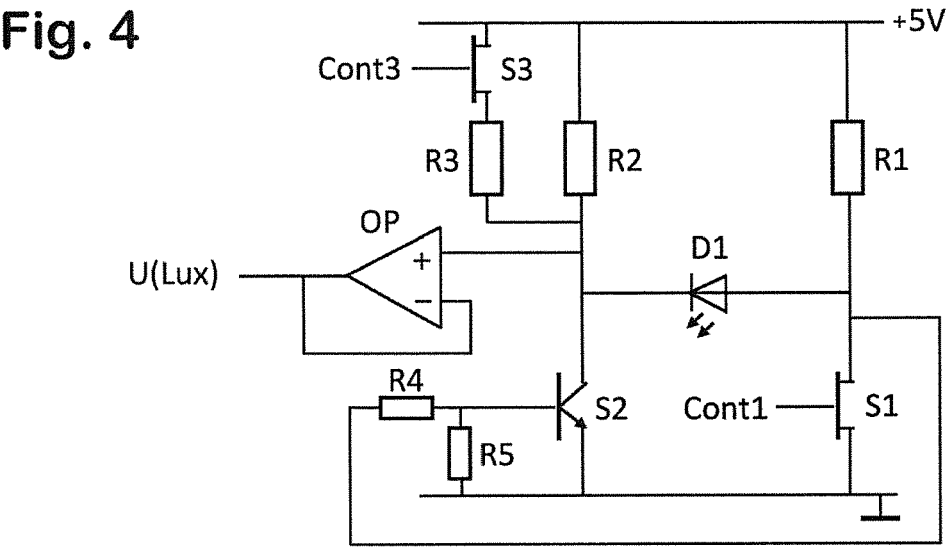
FIG. 4 is a circuit diagram of the complete circuit.

The switches S1 to S3 are electronic switches, of course. In the exemplary embodiment, the switches S1 to S3 are designed as single transistors, wherein the second switch S1 can be formed by a bipolar transistor and the first switch S2 and the third switch S3 can each be formed by a field-effect transistor (FET), as shown in FIG. 4.

The cathode of the LED D1 is connected to the signal input of the operational amplifier OP, which senses a positive voltage applied to the cathode of the LED D1 and outputs it as an amplified brightness signal U(Lux).

In an illumination state of the circuit shown in FIG. 1, the switch S1 is turned off, and the switch S2 turns on and off rapidly in accordance with a PWM square-wave signal, by means of which it is activated, so that the state of the circuit changes rapidly back and forth between the illumination state shown in FIG. 1 and the measurement state (FIG. 2 or FIG. 3) and the LED D1 appears to illuminate with a brightness corresponding to the duty cycle of the square-wave signal, wherein the current through R1, D1, and S2 of +5 V flows to ground, i.e., in the transmission direction of the LED D1.

In times in which the switch S2 is turned off and the LED D1 does not illuminate, the LED can be switched as a light sensor, in that the switch S1 is turned on, as shown in FIG. 2, so that a voltage having inverted polarity to the LED illumination voltage is applied to the LED D1. In this state, a very small current flows through R2, D1, and S1 of +5 V to ground, i.e., in the blocking direction through the LED D1. The current strength of such a photocurrent is dependent on the brightness of the ambient light incident on the LED D1, which is illustrated in FIGS. 2 and 3 as inverted light arrows at the LED D1. Typically, such photocurrents are several microamps.

If such a photocurrent flows, a voltage having inverted polarity to the LED illumination voltage is applied to the LED D1. The voltage drop at resistor R2 increases linearly with the ambient luminosity. This light sensor voltage is buffered by the operational amplifier OP and is output as the brightness signal U(Lux). The brightness signal U(Lux) determines which duty cycle of the PWM square-wave signal is set, normally such that a greater ambient luminosity results in a greater LED brightness.

Using the switch S3, which is turned off in FIGS. 1 and 2, measurement range and resolution of the light measurement can be changed, in that the effective pull-up resistance value is determined optionally only by resistor R2 or by the parallel circuit of resistors R2 and R3. If the switch S3 is turned on in addition to the switch S1, as shown in FIG. 3, the light measurement is less sensitive and a greater measurement range is selected than with the circuit state shown in FIG. 2.

FIG. 4 shows the complete circuit of the LED arrangement with the exception of the PWM control part, which is known in the art. Switch S1 is implemented by an N-channel field effect transistor (N-FET), switch S2 by a bipolar transistor, and switch S3 by a P-channel field effect transistor (P-FET). A part of the voltage at the anode of the LED D1 is supplied via a voltage divider R4, R5 to the base of the bipolar transistor S2, so that it turns on and off inversely to the N-FET S1, the on and off switch state of which is determined by a PWM control signal Cont1.

If the PWM control signal Cont1 is at a low voltage level, the N-FET S1 is in the blocking state, and the bipolar transistor S2 is in the transmission state, so that the LED D1 is switched as a light emitter. In this state, the P-FET S3 is in the blocking state in accordance with a control signal Cont3, which is further described hereafter, at the base of the P-FET S3.

If the PWM control signal Cont1 is at a high voltage level, the N-FET S1 is in the transmission state and at the same time the bipolar transistor S2 is in the blocking state. In this combination of switching states, the LED D1 is switched as a light sensor, wherein a photocurrent flows either through RESISTOR R2 or through RESISTORS R2 and R3, depending on whether the voltage level of Cont3 is low or high.

Figure 5:
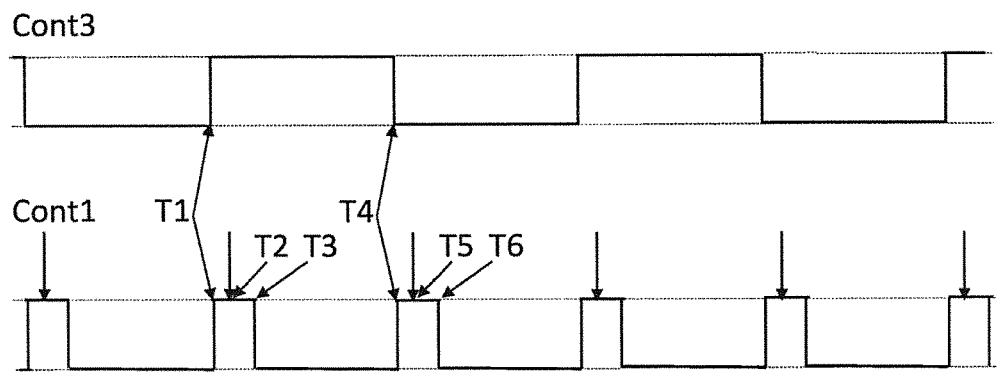
FIG. 5 is a timing diagram illustrating a timing of the switch over during operation of the circuit.

FIG. 5 shows a timing of the switchover between light emission and light measurement using two light measurement ranges. The PWM control signal Cont1 is the (inverted) PWM signal for controlling the LED brightness.

A new PWM cycle begins at time T1. The LED D1 initially does not illuminate, but rather operates as a light sensor, specifically in a lower measurement range having higher sensitivity, because the control signal Cont3 derived from the PWM control signal Cont1 puts the P-FET S3 in the blocking state.

At time T2, the photocurrent measurement has stabilized and the operational amplifier OP outputs a brightness signal U(Lux) for the lower measurement range.

At time T3, the LED D1 is switched into the light-emitting state, in that switch S1 is opened and switch S2 is closed. The time T3 varies with the PWM duty cycle. For the preceding stabilization of the photocurrent and the photocurrent measurement itself, only approximately 5% of the period duration of the square-wave signal is required according to one embodiment, so that in practical applications, the turned-on duration of the LED D1 can be between 0 and 95% of the PWM cycle.

At time T4, one PWM period after time T1, the next PWM cycle begins. The LED D1 no longer illuminates, but rather operates as a light sensor, specifically in an upper measurement range having lower sensitivity, because the control signal Cont3 derived from the PWM control signal Cont1 puts the P-FET S3 into the transmission state.

At time T5, the photocurrent measurement has stabilized, and the operational amplifier OP outputs a brightness signal U(Lux) for the upper measurement range.

At time T6, the LED D1 is switched back into the light-emitting state, in that switch S1 is opened and switch S2 is closed.

The next double PWM cycle then follows such a described double PWM cycle for the two measurement ranges.

Figure 6:
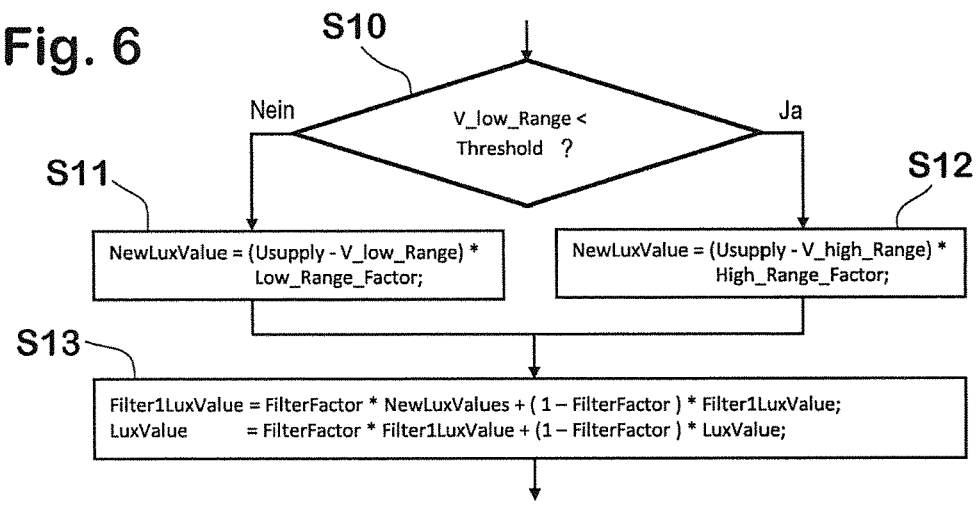
FIG. 6 is a flow chart further illustrating measured value calculations during operation of the circuit.

An algorithm for measured value calculation when switching over between two measurement ranges is illustrated in the flow chart of FIG. 6. The algorithm may be executed using analog and/or digital circuitry such as a processor. The abbreviations used therein are defined as follows, wherein V_low_Range and V_high_Range are the respective voltages measured by the operational amplifier OP at the cathode of the LED D1.

V_low_Range variable for measured voltage in the lower measurement range

V_high_Range variable for measured voltage in the upper measurement range

Threshold measured voltage when the lower measurement range moves into saturation Usupply supply voltage Low_Range_Factor conversion factor from voltage into lux value in the lower measurement range High_Range_Factor conversion factor from voltage into lux value in the upper measurement range FilterFactor a value in the range from 0 to 1, preferably a value of 0.2 for a PWM frequency of 200 Hz NewLuxValue unfiltered new lux value after two PWM cycles Filter1LuxValue lux value after first filter stage LuxValue lux value after second filter stage. This is also the output value of the algorithm, which is also incorporated as the lux value of the last measurement back into the filter algorithm With increasing ambient brightness, the voltage sensed at the cathode of the LED D1 during the photocurrent measurement becomes less. From a specific threshold value, the LED D1 is no longer capable of driving a corresponding higher current, and the resistor R3 is switched in to permit a higher pull-up current.

In particular, it is checked in a step S10 whether V_low_Range is less than Threshold. If not, in step S11, either the NewLuxValue of the lower measurement range is calculated or, in step S12, the NewLuxValue of the upper measurement range is calculated. The voltage drop at the pull-up resistor R2 or at the parallel circuit of resistors R2 and R3 during the measurement is proportional to the brightness lux value. To obtain the measured lux value, (Usupply−measured voltage) *conversion factor has to be calculated.

The calculated NewLuxValue is subjected to a two-stage filtering in step S13. The two values which are obtained upon switching over between the measurement ranges do not exactly correspond because of tolerances. A second-order low-pass filtering is therefore carried out to avoid switching noise in the LuxValue. The output value LuxValue thus obtained determines which PWM duty cycle between 0 and 95% is set.

According to one embodiment, the at least one LED is arranged together with a first and a second transistor, and if necessary resistors, in a bridge circuit. Therein, the first transistor applies the LED illumination voltage to the LED in accordance with the square-wave signal, so that the LED illuminates in a pulse-width-modulated manner. The second transistor applies a voltage having inverted polarity to the LED illumination voltage to the LED in time intervals of the turned-off times of the LED. The inverted voltage represents a light sensor voltage, which causes the LED to act as a light sensor for the ambient light received thereby. The duty cycle of the square-wave signal is dependent on the strength of a photocurrent which flows through the LED when the voltage having inverted polarity is applied thereto. The LED arrangement is implementable with relatively few active components without a microprocessor and therefore with little expenditure.

In certain embodiments, in a first combination of switching states of the two transistors, the cathode of the LED is connected to the positive pole of a voltage source and the anode is connected to the negative pole of the voltage source, if necessary via resistors, and in a second combination of switching states of the two transistors, the cathode of the LED is connected to the negative pole of a voltage source and the anode is connected to the positive pole of the voltage source, if necessary via resistors.

In some embodiments, the voltage and current source supplies approximately 5 V. This voltage value, in conjunction with suitably dimensioned resistors in the bridge circuit, enables the LED to be supplied in illumination operation and in light sensor operation with the respective optimum voltage and maximum current strength by means of a single supply voltage, without it being damaged, and a voltage of 5 V also corresponds well to the supply voltage of an operational amplifier, as is preferably used for measuring the photocurrent strength.

In some embodiments, the LED arrangement contains a third transistor and optionally further transistors, which, depending on the position thereof, place different electrical resistances in the current path, which the current takes through the LED when the voltage having inverted polarity is applied thereto. Measurement range and resolution of the light measurement can therefore be changed.

In an exemplary embodiment, the first transistor is a bipolar transistor and/or the second and optionally the third and further transistors are field-effect transistors (FETs).

In one embodiment, the arrangement comprises a plurality of LEDs, of which at least two LEDs are each arranged in a bridge circuit. The plurality of LEDs can be caused to illuminate in accordance with a square-wave signal, the duty cycle of which is set as a function of a mean value of the measured current strengths of the photocurrents flowing through the at least two LEDs. If many individual measurements by means of many LEDs are incorporated into the mean value, redundancy is obtained for the case in which one LED fails. If necessary, any implausible measured values can also be discarded.

In one embodiment, the intervals of the turned-off times of the LED in which a voltage having inverted polarity to the LED illumination voltage is applied to the LED are fixed time intervals, which make up approximately 5% of the period duration of the square-wave signal.

In one embodiment, the measurement range of an LED operated as a light sensor is switched over from period to period of the square-wave voltage and/or switched over if needed, namely when the lower measurement range enters saturation.

In one embodiment, a measurement signal for the ambient luminosity which is obtained during periodic measurement range switchover is filtered by means of a low-pass filter, in particular by means of a second-order low-pass filter.

The LED arrangement is especially suitable for cockpit illumination in vehicles, in particular motor vehicles, for ambient-light-dependent regulation of the brightness thereof. In this case, multiple LEDs, using which the ambient luminosity is measured, can be arranged at separate locations, so that a good mean value is obtained for the interior brightness prevailing in the region of the cockpit, which is measured from the optimum direction by means of the one or several illumination LEDs themselves and also independently of the intrinsic light thereof. A cockpit illumination controller regulates the brightness of the illumination or background illumination of multiple instruments on the dashboard in accordance with the ambient luminosity prevailing therein.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An LED arrangement comprising:
at least one LED which receives an LED illumination voltage in accordance with a square-wave signal, wherein brightness of the LED is dependent on the ambient luminosity, which is measured by the LED, which is switched in a non-illuminated state as a light sensor;
first and second transistors arranged together with the at least one LED in a bridge circuit such that the first transistor applies the LED illumination voltage to the LED in accordance with the square-wave signal, and the second transistor applies a voltage having inverted polarity to the LED illumination voltage to the LED in intervals of turned-off times of the LED, wherein a duty cycle of the square-wave signal is dependent on strength of a photocurrent which flows through the LED when the voltage having inverted polarity is applied thereto, and
at least a third transistor which, depending on the position thereof, places different electrical resistances in the current path, which the current takes through the LED when the voltage having inverted polarity is applied thereto.

2. The LED arrangement as claimed in claim 1, wherein in a first combination of switching states of the two transistors, the cathode of the LED is connected to the positive pole of a voltage source and the anode is connected to the negative pole of the voltage source, and in a second combination of switching states of the two transistors, the cathode of the LED is connected to the negative pole of a voltage source and the anode is connected to the positive pole of the voltage source.

3. The LED arrangement as claimed in claim 2, wherein the voltage source supplies approximately 5 V.

4. The LED arrangement as claimed in claim 1, wherein the arrangement contains a circuit, in particular an operational amplifier, for sensing the photocurrent.

5. The LED arrangement as claimed in claim 1, wherein the first transistor is a bipolar transistor and/or the second and the third transistors are field-effect transistors.

6. The LED arrangement as claimed in claim 1, wherein the arrangement comprises a plurality of LEDs, of which at least two LEDs are each arranged in a bridge circuit.

7. An LED arrangement comprising:
an LED; and
first and second transistors arranged with the LED in a bridge circuit, wherein the first transistor applies illumination voltage to the LED with a square-wave signal having a duty cycle dependent on a measured photocurrent, and the second transistor applies a voltage having inverted polarity to the illumination voltage to the LED in intervals of turned-off times of the LED to measure the photocurrent, wherein a plurality of LEDs is caused to illuminate in accordance with the square-wave signal, the duty cycle of which is set as a function of a mean value of the measured current strengths of the photocurrents flowing through at least two of the LEDs.

8. The LED arrangement as claimed in claim 7, wherein in a first combination of switching states of the two transistors, the cathode of the LED is connected to the positive pole of a voltage source and the anode is connected to the negative pole of the voltage source, and in a second combination of switching states of the two transistors, the cathode of the LED is connected to the negative pole of a voltage source and the anode is connected to the positive pole of the voltage source.

9. The LED arrangement as claimed in claim 8, wherein the voltage source supplies approximately 5 V.

10. The LED arrangement as claimed in claim 7, wherein the arrangement contains a circuit, in particular an operational amplifier, for sensing the photocurrent.

11. The LED arrangement as claimed in claim 7, wherein the arrangement comprises at least a third transistor which, depending on the position thereof, place different electrical resistances in the current path, which the current takes through the LED when the voltage having inverted polarity is applied thereto.

12. The LED arrangement as claimed in claim 11, wherein the first transistor is a bipolar transistor and the second and the third transistors are field-effect transistors.

13. The LED arrangement as claimed in claim 7, wherein the arrangement comprises a plurality of LEDs, of which at least two LEDs are each arranged in the bridge circuit.

14. A method for controlling brightness of at least one LED comprising:
providing at least one LED is arranged together with a first transistor and a second transistor in a bridge circuit;
applying via the first transistor an LED illumination voltage to the LED in accordance with a square-wave signal to illuminate the LED;
applying via the second transistor a voltage having inverted polarity to the LED illumination voltage to the LED in intervals of the turned-off times of the LED to thereby operate as a light sensor for the ambient light incident on the LED in a non-illuminated state;
measuring strength of a photocurrent flowing through the LED; and
setting a duty cycle of the square-wave signal as a function of the measured photocurrent strength to thereby control brightness of the at least one LED as a function of ambient luminosity, wherein the LED is a component of a cockpit illumination in a vehicle for ambient-light-dependent regulation of the brightness thereof.

15. The method as claimed in claim 14, wherein a plurality of LEDs is caused to illuminate in accordance with a square-wave signal, the duty cycle of which is set as a function of a mean value of the measured current strengths of the photocurrents flowing through at least two of the LEDs.

16. The method as claimed in claim 14, wherein the intervals of the turned-off times of the LED in which a voltage having inverted polarity to the LED illumination voltage is applied to the LED are fixed time intervals, which make up approximately 5% of the period duration of the square-wave signal.

17. The method as claimed in claim 14, wherein the measurement range of the or each LED operated as a light sensor is switched over from period to period of the square-wave voltage or is at least switched over when the lower measurement range enters saturation.

18. The method as claimed in claim 17, wherein a measurement signal for the ambient luminosity which is obtained during periodic measurement range switchover is filtered by a low-pass filter, in particular by a second-order low-pass filter.

* * * * *